United States Patent [19]

Richard

[11] Patent Number: 4,880,994
[45] Date of Patent: Nov. 14, 1989

[54] METHOD AND DEVICE FOR THE REDUNDANT CONTROL OF A POWER CONTROLLED UNIT

[75] Inventor: Frecon Richard, Chavanay, France

[73] Assignee: La Telemecanique Electrique, France

[21] Appl. No.: 166,121

[22] PCT Filed: Jun. 17, 1987

[86] PCT No.: PCT/FR87/00223
§ 371 Date: Feb. 17, 1988
§ 102(e) Date: Feb. 17, 1988

[30] Foreign Application Priority Data
Jun. 18, 1986 [FR] France ................ 86 09148

[51] Int. Cl.[4] ............ H01J 19/82; H03K 17/56; H03K 9/06; H03K 5/22
[52] U.S. Cl. ............... 307/219; 307/441; 307/241; 307/242; 307/243; 307/355; 307/528; 307/631; 307/632; 307/643; 307/644
[58] Field of Search ........... 307/219, 441, 241, 242, 307/243, 355, 528, 631, 632, 643, 644

[56] References Cited

U.S. PATENT DOCUMENTS

| | | | |
|---|---|---|---|
| 3,201,701 | 8/1965 | Maitra | 307/441 |
| 3,299,341 | 1/1967 | Corey | 307/644 |
| 3,417,320 | 12/1968 | Muskovac | 307/630 |
| 3,421,027 | 1/1969 | Maynard et al. | 307/630 |

Primary Examiner—Stanley D. Miller
Assistant Examiner—Trong Quang Phan
Attorney, Agent, or Firm—William A. Drucker

[57] ABSTRACT

A device and method are provided for the redundant control of a power controlled device (R). The redundant control device comprises two programmable controllers ($A_1$, $A_2$) adapted for elaborating a control order. These two programmable controllers ($A_1$, $A_2$) are equipped with two respective logic circuits designed so as to apply to two outputs ($s_1$, $s_2$) two logic signals ($S_1$, $S_2$) whose combination using the EXCLUSIVE OR function is the image of the control order. The power device (R) is then controlled by a control member (O) connected by its two inputs, to said two outputs ($s_1$, $s_2$) and performing the logic EXCLUSIVE OR function of the signals ($S_1$, $S_2$) delivered by these two outputs. With this device, independently of the breakdown state of one of the two control circuits, the state of the controlled device always corresponds to the control order.

5 Claims, 3 Drawing Sheets

METHOD AND DEVICE FOR THE REDUNDANT CONTROL OF A POWER CONTROLLED UNIT

The present invention relates to a redundant control method and device for controlling a power controlled unit in accordance with a given control order, by a logic combination of two separate control signals elaborated by two respective circuits, from said control order, and two signals representative of the operating state of these two circuits.

It is generally known that the use of redundant circuits for effecting a control essentially responds to safety requirements. To this end, the simplest solution consists in doubling the control circuits and in substituting one for the other when a failure is detected in the operating circuit.

However, it proves that this solution has a certain number of drawbacks and, in particular the one resulting from the fact that an operating failure of the control circuit in operation will necessarily result, at least during the time required for bringing the second control circuit into service, in a discordance between the control order and the effective state of the controlled device. This is why this solution is not suitable for the automatic controllers used, particularly in the chemical and petrochemical industries, which allow no interruption of the process (it is not always possible to interrupt a chemical reaction) and a very great safety.

Furthermore, it is necessary to provide in these control systems, means for making sure that the stand by control circuit, to be substituted for the other at the time of a failure, operates correctly.

The object of the invention is therefore to overcome these drawbacks and to make sure that, independently of the breakdown state of one of the two control circuits, the state of the controlled device always corresponds to the control order. It provides more particularly for this purpose a method for the redundant control of a power controlled unit in accordance with control orders elaborated by at least one digital control device and/or applied thereto, this method being more particularly characterized in that it comprises:

the application to the power controlled device of a control signal resulting from a logic combination of two logic signals delivered by two separate outputs of the digital control device and elaborated thereby, so that said control signal conforms to said control orders;

the detection of failures which may affect the signals delivered by said outputs; and when a failure of the signal emitted by one of the outputs has been detected, the self adaptation of the signal emitted by the other output, depending on the nature of this failure, so that the signal resulting from said logic combination also conforms to the control orders.

Advantageously, the signals delivered by said outputs of the digital control device will consist of binary signals and the combination of these signals for obtaining the control signal will be achieved by the EXCLUSIVE OR function. The control signal will then consist of a binary signal having a state 1 in the case where, at the same time, the logic states of the signals delivered by said outputs are different and a logic state 0 in the case where these states are identical.

Should a failure of one of the outputs result in blocking of the signal delivered by this output at one of the two states, the signal emitted by the other output will then consist of the image of the control order in the case of blocking in state 0 or a complemented image of this order in the case of blocking in state 1.

The invention may also apply to a monoprocessor digital control device such for example as a programmable controller which will then have two outputs capable of delivering said two logic signals, as well as to a control device with two processors coupled together and each having an output assigned to the control.

Thus, in one embodiment of the invention using two processors coupled together and each having an output for providing the redundant control of the same power device, the method of the invention will include:

for generating the signal delivered by the output of the first processor, the elaboration of a first logic signal whose two states are representative of a fault or the absence of a fault, this first logic signal being obtained by performing the EXCLUSIVE OR function of a logic signal which is the image of the control order and a logic signal coming from the EXCLUSIVE OR combination of the control state of the signal delivered by the output of the second processor, and a square wave signal delivered by an oscillator, and the application to the output of the first processor of a signal resulting from the EXCLUSIVE OR combination of said first logic signal with said square wave signal; and for generating the signal delivered by the output of the second processor, the elaboration of a second logic signal whose two states are representative of a fault or absence of a fault, this second logic signal being obtained by performing the EXCLUSIVE OR function or a logic signal which is the image of the control order and a signal obtained form the logic combination of the control state of the signal delivered by the output of the first processor and a third signal itself resulting from the logic combination of the control order elaborated by the second processor and of said square wave signal, and the application to the output of the second processor of a signal resulting from the EXCLUSIVE OR combination of said second logic signal with said third signal.

As mentioned above, the invention also relates to a device for implementing the above described method, this device including at least one control device capable of elaborating a control order, this device being more particularly characterized in that said control device comprises a logic circuit adapted for applying to two separate outputs two logic signals whose combination in accordance with the EXCLUSIVE OR logic function is the image of the control order, and in that the power device is controlled by a power member connected by its two inputs to said two outputs and performing the EXCLUSIVE OR logic function of the signals delivered by these two outputs.

In a particularly advantageous embodiment of the invention, in the case where the power controlled device is formed by a relay fed from an AC source, said control member includes a bridge circuit with, between the two terminals of the source, a first branch comprising in series a first resistor and a first controllable switch controlled by the signal delivered by one of said two outputs and a second branch including a second resistor and a second controllable switch controlled by the signal delivered by the second output. In this case, the two terminals of the coil of the relay are respectively connected to the two middle points of the bridge which form the junction of the first resistor with the first switch and of the second resistor with the second switch.

In the case where the power device consists of a relay fed from a DC source, said logic control circuit also includes a bridge circuit similar to the preceding one. However, in this case, the two middle points of the bridge are connected to the terminals of the coil of the relay through a diode rectifying bridge.

Embodiments of the invention will be described hereafter by way of non limitative examples with reference to the accompanying drawings in which.

Figure 1:
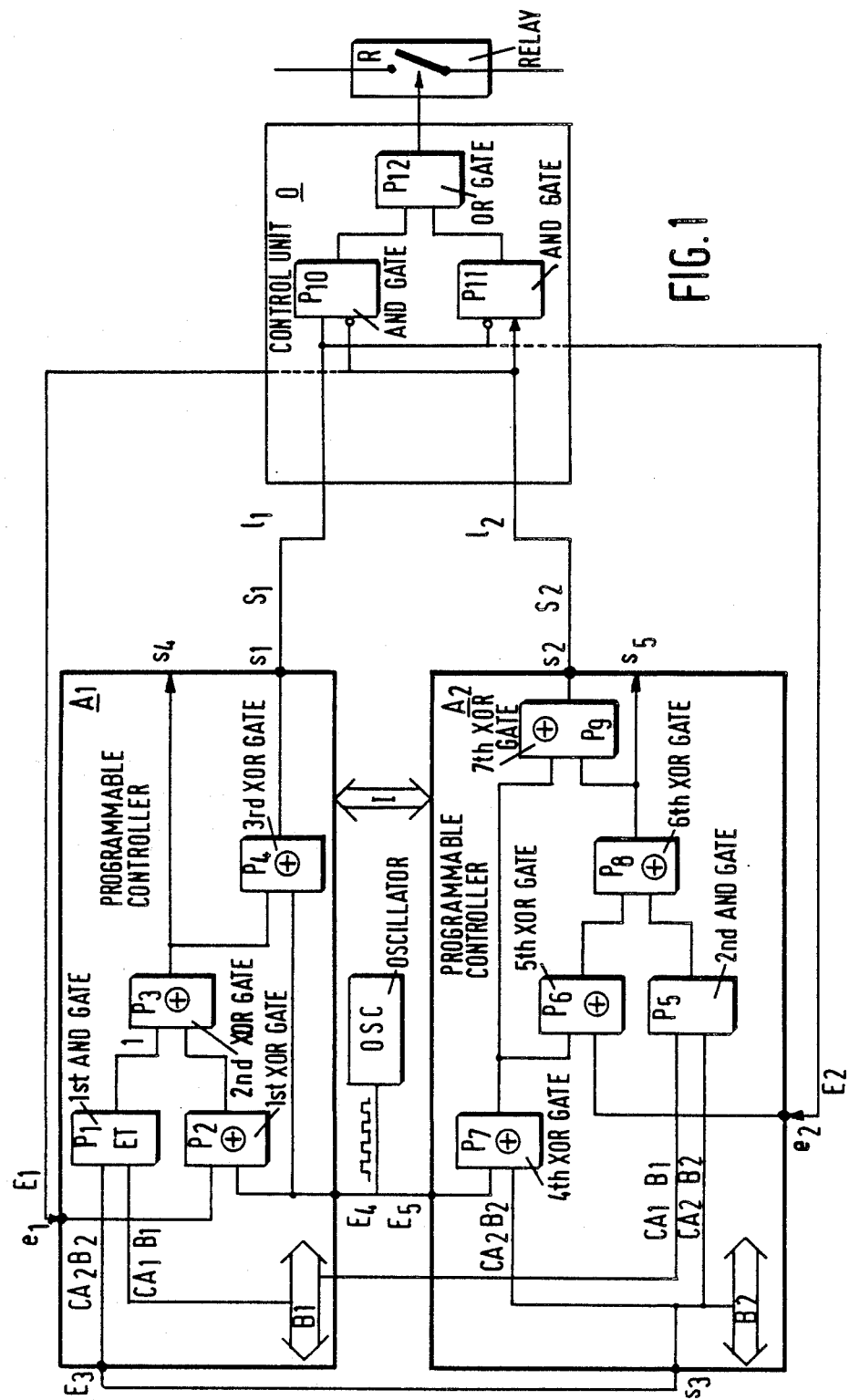
FIG. 1 is a schematical representation of a circuit illustrating the principle of controlling a power controlled unit by the two respective outputs of two programmable controllers.

In the example shown in FIG. 1, the two programmable controllers have been shown schematically by the blocks $A_1$, $A_2$ shown with thick lines.

Only the elements of these programmable controllers forming more specifically part of the device of the invention have been shown, for the sake of simplicity, and in particular the outputs $s_1$ to $s_5$, the inputs $e_1$ to $e_5$, the interconnection lines I of the two programmable controllers, the buses $B_1$, $B_2$ of these two programmable controllers, as well as the logic circuits elaborating the signals $S_1$, $S_2$ applied to the output $s_1$, $s_2$ of the programmable controllers $A_1$, $A_2$, from control orders generated on the buses $B_1$, $B_2$ by the respective central units. Of course, the logic functions performed by these circuits could just as well be provided by an appropriate software.

On the other hand, the central units of these programmable controllers $A_1$, $A_2$ as well as all the other elements conventionally forming part of this type of apparatus, have not been shown.

Similarly, in this Figure, the power controlled device has been shown schematically in the form of a controllable switch R driven by a control member 0.

The logic circuit for elaborating the signal $S_1$ applied to terminal $s_1$ of programmable controller $A_1$ first of all includes a first logic gate $p_1$ which provides the AND function and which receives at its two inputs, on the one hand a signal $CA_2B_2$ representative of the control order generated on bus $B_2$ of the programmable controller $A_2$ and, on the other hand, a signal $CA_1B_1$ representative of the control order generated on the bus $B_1$ of the programmable controller $A_1$.

It is clear that in normal operation the signals $CA_1B_1$ and $CA_2B_2$ are substantially identical and the AND gate $P_1$, which only plays a synchronization role, delivers at its output a signal which is the image of the control order.

This output of gate $P_1$ is connected to one of the inputs of a gate $P_3$ performing the EXCLUSIVE OR (XOR) function which receives at its second input a signal delivered by an EXCLUSIVE OR gate $P_2$. This gate $P_2$ receives at one of its two inputs a signal representative of the state of the signal $S_2$ at the level of the control member 0 associated with the controllable switch R and, at its other input, a square wave signal delivered by an oscillator OSC.

In normal operation, as will be seen further on, this gate $P_2$ delivers a signal which is the image of the control order.

Consequently, gate $P_3$ will deliver at its output a signal whose state 0 corresponds to the identity of the images of the control order elaborated by gates $P_1$ and $P_2$. On the other hand, when there is discordance between these two images, gate $P_3$ will pass to state 1 thus indicating a fault.

The output of gate $P_3$ is connected on the one hand to terminal $s_4$ to which may be connected for example a fault signalling member and, on the other hand, to one of the two inputs of an EXCLUSIVE OR gate $P_4$ which receives at its other input the square wave signal coming from the oscillator OSC.

The output of gate $P_4$ is connected to the output $s_1$ of the programmable controller which delivers the signal $S_1$. It is clear that in normal operation gate $P_4$ will deliver a square wave signal in phase with that produced by the oscillator. On the other hand, in the case of a fault resulting in the output of gate $P_3$ passing to and being held in state 1, the square waves delivered by gate $P_4$ will be in phase opposition with respect to those of the oscillator.

Similarly, the logic circuit for elaborating the signal $S_2$ applied to terminal $s_2$ of the programmable controller $A_2$ includes an AND logic gate $P_5$ which receives at its two inputs, on the one hand, a signal $CA_1B_1$ representative of the control order generated on bus $B_1$ of the programmable controller $A_1$ and, on the other hand, a signal $CA_2B_2$ representative of the control order generated on bus $B_2$ of the programmable controller $A_2$. This AND gate $P_5$ plays strictly the same role as gate $P_1$.

The output of this gate $P_5$ is connected to one of the inputs of an EXCLUSIVE OR gate $P_8$ which receives at its second input a signal delivered by an EXCLUSIVE OR gate $P_6$. This EXCLUSIVE OR gate $P_6$ receives at one of its inputs a signal representative of the state of the signal $S_1$ at the level of the control member 0 associated with the controllable switch R and, at its other input, a signal emitted by an EXCLUSIVE OR gate $P_7$.

This gate $P_7$ receives both the square wave signal delivered by the oscillator and the signal $CA_2 \cdot B_2$.

It is clear that in normal operation, gate $P_7$ delivers a square wave signal in which the square waves in phase with those of the oscillator correspond to the 0 state of the control order and the square waves in phase opposition correspond to the 1 state of this control order. The EXCLUSIVE OR combination in gate $P_6$ of this signal and of signal $E_2$ delivers then a signal which is the image of the control order. At the output of gate $P_8$, a signal will then be obtained whose 0 state signifies normal operation and whose 1 state signifies a fault.

The output of gates $P_7$ and $P_8$ are respectively connected to the two inputs of an EXCLUSIVE OR gate $P_9$ whose output is connected to the output $s_2$. In normal operation, this gate $P_9$ will deliver a signal similar to that delivered by gate $P_7$. On the other hand, at the time of a fault (output of $P_8$ at state 1) it will deliver a signal in phase opposition with the signal delivered by gate $P_7$.

In this example, the control member associated with the controllable switch R performs the EXCLUSIVE OR function by means of a logic circuit including two AND gates $P_{10}$ and $P_{11}$ which each have a direct input and a complemented input, and an OR gate $P_{12}$ which receives the signals delivered by the AND gates $P_{10}$ and $P_{11}$. The output of this gate $P_{12}$ controls the switch R. The direct inputs of the AND gates $P_{10}$ and $P_{11}$ are connected respectively to the outputs $s_1$ and $s_2$ of the automata $A_1$ and $A_2$, through a distance connection by means of line conductors ($L_1$ and $L_2$). Furthermore, the complemented input of one of the AND gates $P_{10}$, $P_{11}$ is connected to the direct input of the other AND gate $p_{10}$, $P_{11}$. Furthermore, the direct input of gate $P_{10}$ is connected to the input $e_2$ of programmable controller $A_2$ so as to deliver the signal $E_2$, whereas the direct input of gate $P_{11}$ is connected to the input $e_1$ of programmable controller $A_1$ so as to deliver the signal $E_1$.

It is clear that in normal operation the EXCLUSIVE OR combination of signals $S_1$ and $S_2$ makes it possible to obtain a signal which is the image of the control order.

It is the same when a fault occurs in one of the circuits associated with the automata $A_1$ and $A_2$.

Thus, if, following a breakage of line $l_1$, the signal at the direct input of gate $P_{10}$ is forced to 0, the signal $E_2$ will also be at state 0. The complemented input of the AND gate $P_{11}$ will be brought to state 0 so that this gate $P_{11}$ will then deliver a signal which is the image of the output $S_2$.

Gate $P_6$, one input of which is forced to 0 (signal $E_2$), delivers at its output a signal similar to that of gate $P_7$, i.e. a square wave signal in phase with that of the oscillator when the control order is at 0 and in phase opposition when this order is at state 1.

At the output of gate $P_8$, whatever the state of the order, a square wave signal is obtained in phase with the square wave signal delivered by the oscillator and at output $s_2$ we than have a signal $S_2$ which is the image of the control order.

Similarly, in the case where, following a breakdown, the signal applied to the direct input of gate $P_{10}$ remains blocked at 1, gate $P_{11}$ will be disabled whereas gate $P_{10}$ will deliver at its output the complement of signal $S_2$. In this case, the signal $E_2$ is at state 1 and consequently a signal $S_2$ is obtained which is the complement of the control order.

A similar procedure would occur in the case of blocking of line $l_2$ at 0 or at 1, the signal $S_1$ then being in this case a direct image or a complemented image of the control order.

Figure 2:
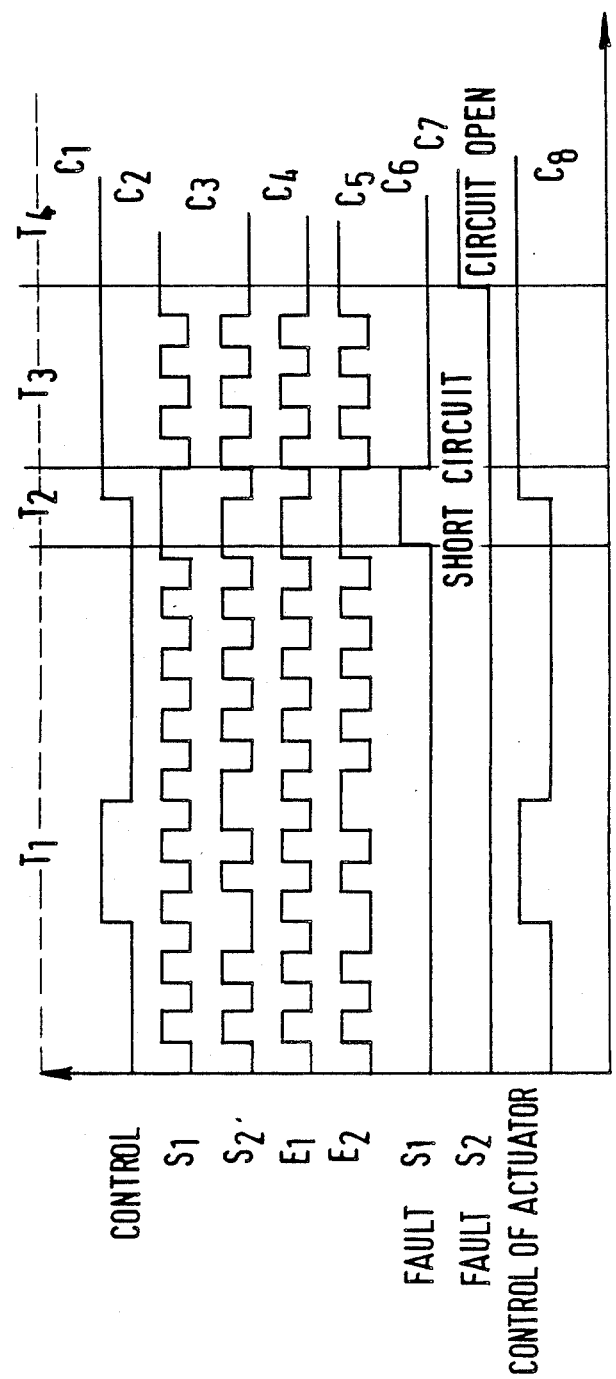
FIG. 2 is a diagram representative of the signals obtained at different points of the circuit shown in FIG. 1.

Such operation is illustrated by the oscillograms shown in FIG. 2 in which the time period $T_1$ corresponds to normal operation of the programmable controller period $T_2$ corresponds to operation due to a fault causing blocking of output $s_1$ at state 0, and period $T_3$ corresponds to operation due to a fault causing the output $s_1$ to be blocked at state 1.

More precisely, the oscillogram $C_1$ is a representation in time of the control order, this latter passing from state 0 to state 1 in each of said periods.

The oscillograms $C_2$ and $C_3$ show the evolution in time of the signals $S_1$ and $S_2$ applied to the terminals $s_1$ and $s_2$, taking into account the control order.

The oscillograms $C_4$ and $C_5$ show the evolution in time of the signals $E_1$ and $E_2$.

The oscillograms $C_6$ and $C_7$ are curves whose 1 state signifies the presence of an operational fault. Thus, in the curve $C_6$, passing to state 1 corresponds to blocking of the signal $S_1$ at state 1 and, in the curve $C_7$, passage to state 1 corresponds to forcing the signal $S_2$ to 0.

The oscillogram $C_8$ corresponds to the control signal applied to the controllable switch R which conforms to the control order illustrated at $C_1$.

As can be seen, during the period $T_1$, the signal $S_1$ is a square wave signal in phase with the signal produced by the oscillator, whereas the signal $S_2$ corresponds to the signal $S_1$ when the control order is at state 0 and in phase opposition when the control order is at state 1.

During the period $T_2$, the signal $S_1$ is blocked at 1, whereas the signal $S_2$ consists in the complement of the control order.

During the period $T_3$, no fault is signalled the control order is at state 1 and signals $S_1$ and $S_2$ are in phase opposition.

During the period $T_4$, the signal $S_2$ is blocked at 0 while causing the signal $S_1$ to be held at 1.

It can then be seen that in this system the detection of the breakdown state of any one of the outputs and signalling thereof take place in real time and that the fault location of the detective outputs is transparent for the system since it is achieved under voltage, without stopping and without disturbing the system.

Of course, the invention is not limited to one type of power device or to a particular control member.

Figure 3:
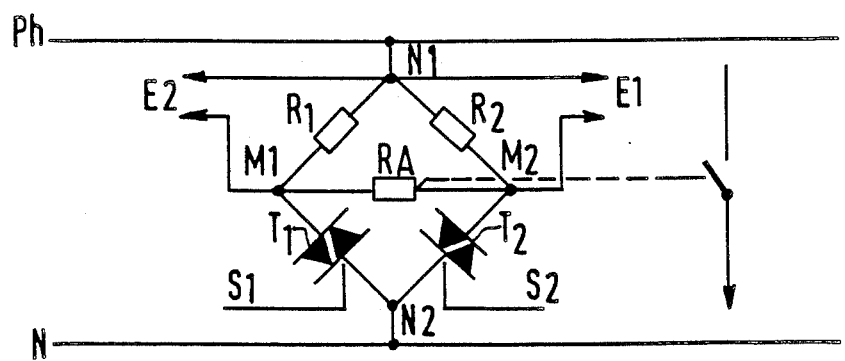
FIG. 3 is the diagram of a circuit for controlling a relay fed with AC current, from signals delivered by the outputs of the two programmable controllers shown in FIG. 1.
Figure 4:
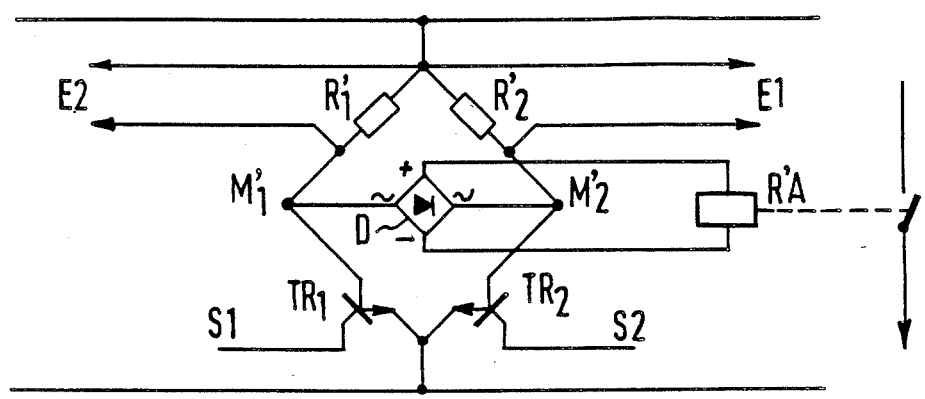
FIG. 4 is a diagram similar to that of FIG. 3, but in the case of a relay fed with DC current.

Thus, FIGS. 3 and 4 show two particularly advantageous embodiments of control members of an AC relay (FIG. 3) and a DC relay (FIG. 4).

More precisely, the control member shown in FIG. 3 includes a bridge circuit whose two end points $N_1$, $N_2$ are connected to the phase conductor Ph and to the neutral N of an AC power supply line. This circuit includes two traics $T_1$, $T_2$ connected respectively between the end point $N_2$ and the two middle points $M_1$, $M_2$ of the bridge and two resistors $R_1$, $R_2$ providing the connection between the two middle points $M_1$, $M_2$ and the end point $N_1$.

The two terminals of the coil RA of the relay are then connected respectively to the two middle points $M_1$, $M_2$ of the bridge.

Furthermore, the gate of the triac $T_1$ is connected to the output $s_1$ of the automaton $A_1$ for example by means of the line $L_1$ and consequently receives the signal $S_1$, whereas the gate of triac $T_2$ is connected to the output $s_2$ of the programmable controller $A_2$ for example by means of the line $L_2$ and consequently receives the signal $S_2$.

In state 1, the signals $S_1$ and $S_2$ enable the corresponding triacs $T_1$ and $T_2$ whereas in state 0 these signals disable these triacs.

The operation of this control member is then as follows.

In the case where one of the signals $S_1$, $S_2$ is at state 1, whereas the other signal is at state 0, one of the two triacs will be enabled whereas the other will be disabled. The coil RA of the relay will then have passing therethrough the AC current from the line and the relay will be at state 1.

In the case where the two signals $S_1$, $S_2$ are at 1, the two triacs $T_1$ and $T_2$ will be enabled. The two terminals of coil RA will then be at the same potential, so that no current will flow through coil RA and that consequently the relay will be at 0.

In the case where the two signals $S_1$, $S_2$ are at 0, the two triacs $T_1$, and $T_2$ will be disabled and, similarly to the preceding case, coil RA whose terminals will be brought to the same potential will have no current flowing therethrough and the relay will be at 0.

It can then be seen that the control of the relay is provided by the logic EXCLUSIVE OR combination of the signals $S_1$ and $S_2$.

Advantageously, the signals $E_1$ and $E_2$ may be taken from the middle points $M_1$ and $M_2$ of the bridge, so that the failures of the triacs $T_1$ and $T_2$ will be taken into account by the system.

The control member shown in FIG. 4, which is intended for a DC relay, similarly comprises a bridge circuit including two resistors $R'_1$, $R'_2$ and, in the place of the triacs $T_1$, $T_2$, two transistors $TR_1$, $TR_2$ connected respectively by their base to the outputs $s_1$ and $s_2$ of the programmable controllers $A_1$ and $A_2$.

In this case, the middle points $M'_1$, $M'_2$ of the bridge are connected to the two AC inputs of a diode rectifying bridge D whose two DC outputs are connected respectively to the two terminals of the coil $R'A$ of the relay.

The operation of this control member is substantially the same as that of the control member described above, the diode rectifying bridge D then being intended to overcome the reversals of polarity of the current flowing between the two middle points of the bridge $R'_1$, $R'_2$, $TR_1$, $TR_2$.

It is apparent that an important advantage of the redundant control device described above, using a power controlled device such as a relay, resides in the fact that the response time of the fault detection and correction system is less than the response time of the relay, so that in any case the state of the power controlled device and consequently of the actuator which is associated therewith always correspond to the state of the control.

Another advantage of this circuit resides in the fact that any failure of any one of the circuits used for the control will generate, at one of the two programmable controllers, an erroneous control order which will be detected by the valid programmable controller. This latter will then elaborate a control signal taking this failure into account.

I claim:

1. A redundant logic circuit comprising first and second logic circuits each having a first input to which a binary logic signal is applied and an output, and a third logic circuit having inputs connected to the respective outputs of the first and second logic circuits, said first and second logic circuits respectively providing first and second output binary logic signals which are first and second respective functions of said binary logic signal and said third logic circuit providing a third output binary logic signal which is a third logic function of both said first and second output signals, the output signal of said third logic circuit being, in a normal mode of operation in which no failure is present in the redundant logic circuit, identical to said binary logic signal, whereas, when a failure is present in the redundant logic circuit, said failure having the effect of forcing to a predetermined logic level the output of either one of said first and second logic circuits, the other one of said first and second logic circuits will provide an output signal which is either identical to said binary logic signal, or the logic complement of said binary logic signal, said first logic circuit having a second input which is connected to the output of said second logic circuit and said second logic circuit having a second input which is connected to the output of said first logic circuit and said first and second logic functions together forming the inverse function of said third function.

2. The redundant logic circuit of claim 1, wherein said third logic function is an EXCLUSIVE OR function.

3. The redundant logic circuit of claim 2, wherein said first logic circuit includes a first AND gate having said first input of the first logic circuit and an output, a first EXCLUSIVE OR gate having said second input of the first logic circuit, a third input and an output, oscillator means generating a square wave signal and connected to said third input, a second EXCLUSIVE OR gate having a first input connected to the output of the first AND gate and a second input connected to the output of the first EXCLUSIVE OR gate, said second EXCLUSIVE OR gate having an output, and a third EXCLUSIVE OR gate which has a first input connected to the oscillator means and a second input connected to the output of the second exclusive OR gate, said third EXCLUSIVE OR gate having said output of the first logic circuit, said second logic circuit includes a second AND gate having said second input of the second logic circuit and an output, a fourth EXCLUSIVE OR gate having said first input of the second logic circuit and a first input connected to said oscillator means, said fourth EXCLUSIVE OR gate having an output, a fifth exclusive OR gate having a first input connected to said second input of said second logic circuit and a second input connected to the output of said fourth EXCLUSIVE OR gate, said fifth EXCLUSIVE OR gate having an output, a sixth EXCLUSIVE OR gate having a first input connected to the output of said fifth EXCLUSIVE OR gate and a second input connected to the output of said second AND gate, said sixth EXCLUSIVE OR gate having an output, and a seventh EXCLUSIVE OR gate having an output, second logic circuit, a first input connected to the output of the fourth EXCLUSIVE OR gate and a second input connected to the output of the sixth EXCLUSIVE OR gate.

4. The assembly of the redundant logic circuit of claim 2 and a AC relay having an energizing coil connected to the output of the third logic circuit, wherein said third logic circuit includes a bridge circuit having first and second terminals respectively connected to the respective terminals of an AC source and third and fourth terminals, first and second resistors respectively connecting the first terminal to the third and fourth terminals and first and second semi-conductor controlled rectifiers respectively connecting the second terminal to the third and fourth terminals, said semi-conductor controlled rectifiers having respective control inputs which are respectively connected to the respective outputs of the first and second logic circuits, and said energizing coil is connected between said third and fourth terminals.

5. The assembly of the redundant logic circuit of claim 2 and a DC relay having an energizing coil connected to the output of the third logic circuit, wherein said third logic circuit includes a bridge circuit having first and second terminals respectively connected to the respective terminals of a DC source and third and fourth terminals, first and second resistors respectively connecting the first terminal to the third and fourth terminals, first and second semi-conductor controlled rectifiers respectively connecting the second terminal to the third and fourth terminals, said semi-conductor controlled rectifiers having respective control inputs which are respectively connected to the respective output of the first and second logic circuit, and a diode rectifier bridge having first and second terminals respectively connected to the third and fourth terminals of said bridge circuit, said rectifier bridge further having third and fourth terminals and said energizing coil being connected between said third and fourth terminals of said diode rectifier bridge.

* * * * *